June 27, 1950 F. F. RIKE 2,512,877
TRUCK TANK EMERGENCY VALVE
Filed Nov. 3, 1948 2 Sheets-Sheet 1

INVENTOR
FRED F. RIKE
By Toulmin & Toulmin
ATTORNEYS

June 27, 1950  F. F. RIKE  2,512,877
TRUCK TANK EMERGENCY VALVE
Filed Nov. 3, 1948  2 Sheets-Sheet 2
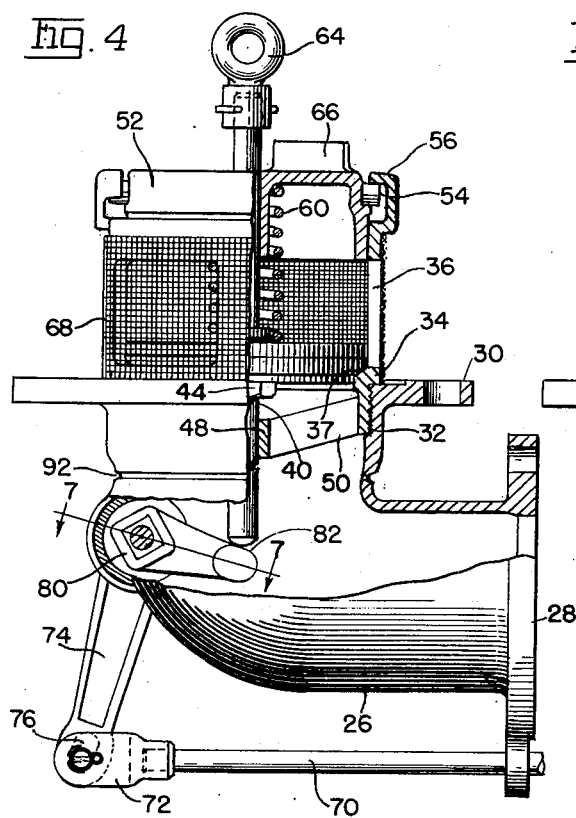
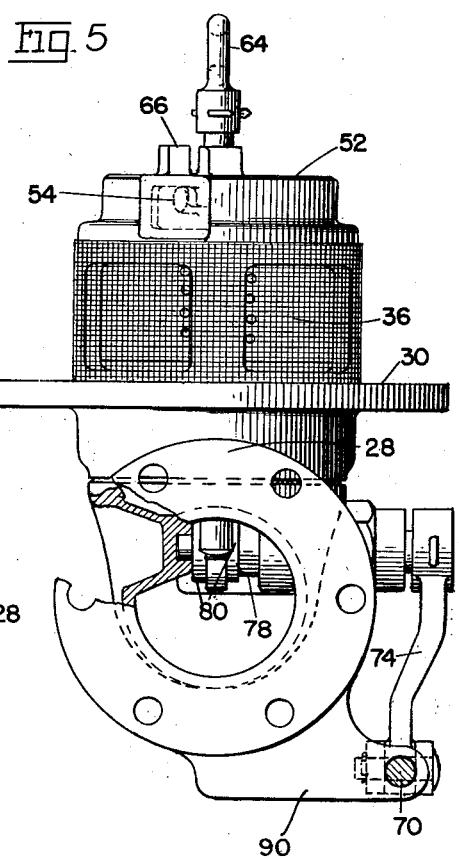
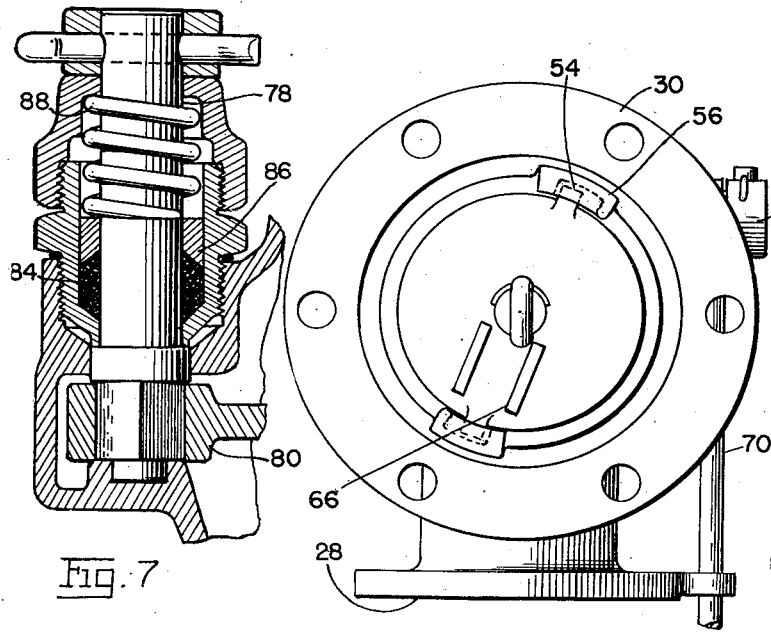
INVENTOR
FRED F. RIKE
By Toulmin & Toulmin
ATTORNEYS Patented June 27, 1950

2,512,877

UNITED STATES PATENT OFFICE 2,512,877

TRUCK TANK EMERGENCY VALVE

Fred F. Rike, Dayton, Ohio, assignor to Buckeye Iron & Brass Works, Dayton, Ohio, a corporation of Ohio Application November 3, 1948, Serial No. 58,119

6 Claims. (Cl. 137—21)

This invention relates to valves, and in particular to so-called emergency valves for use in connection with fluid carriers of the type which are used for carrying oils and fuels, such as gasoline, kerosene, and the like.

In fluid carriers or tank cars, there is provided at the outlet of the tank a valve known as an emergency valve, and which is closed while the fluid carrier or tank car is in transit. The purpose of this valve is to prevent loss of the combustible or explosive fluid in the case of an accident which might damage the piping beneath the tank car.

Due to the nature of the function which such an emergency valve must carry out, it is important that the valve member therein which closes off the fluid flow from the tank be maintained in good condition.

These valves are often used to strain the fluid as it flows from the tank and it is also necessary to have access to the valves in order to clean them. The usual valve, according to prior art practices, was so constructed that it was not possible to remove the portion of the valve it was desired to so clean or maintain without actually getting into the tank and unbolting the valve or otherwise performing what operations were necessary to remove it. Getting into the tank to work on the valve would require that the tank be completely drained and steamed out for safety reasons.

The object of the instant invention is to provide an emergency valve which will overcome the objections referred to above.

It is a particular object of this invention to provide a valve from which the valve member can readily be removed from the filler hole or manhole top of the tank car compartment in which the valve is located.

It is also an object of this invention to provide an emergency valve of simple construction which accordingly will be easy to manufacture and assemble and which can be readily serviced at any time.

It is a still further object of this invention to provide an emergency valve for fluid carriers or tank cars having a minimum number of parts and thus being of inexpensive manufacture.

These and other objects and advantages will become more apparent upon reference to the following description taken in connection with the accompanying drawings in which:

Figure 4 is a side view of the valve of this invention partially cut away to show the arrangement thereof;

Figure 5 is a view looking in at the valve from the right side of Figure 4;

Figure 6 is a plan view of the valve;

Figure 7 is a sectional view indicated by the line 7—7 on Figure 4; and

Figure 1:
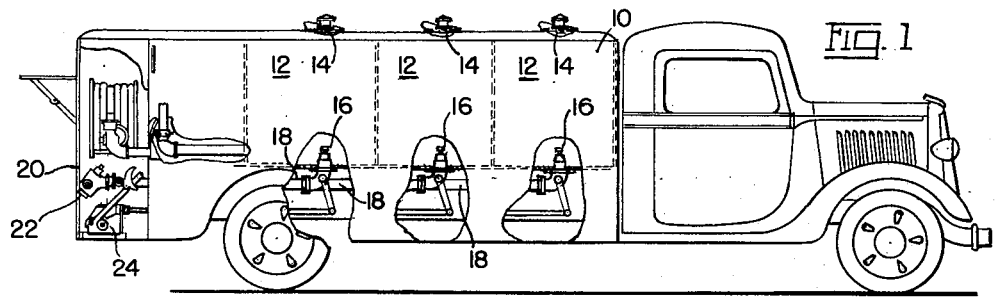
Figure 1 is a side elevational view of a typical fluid carrier or tank car showing the general arrangement thereof and the position therein of safety valves of the type with which this invention is concerned.

Referring to the drawings more in detail, the fluid carrier shown in Figure 1 may comprise the usual automotive vehicle having a tank 10 mounted on the rear thereof and which includes the individual compartments 12. Each of the compartments 12 has a filler opening or manhole 14 at the top thereof and an outlet at the bottom thereof, in which is mounted an emergency valve 16.

The emergency valves 16 are connected by the conduits 18 with the dispensing station 20 at the rear of the truck and at which point each of the said conduits has a manually operable valve 22.

As will be seen hereinafter, the emergency valves 16 are normally closed and there may be provided means for selectively opening them from the dispensing station as by means of the lever mechanism indicated at 24.

Turning now to Figures 2 through 6, it will be seen that the emergency valve of this invention includes an L-shaped body part 26 having a flange 28 for connection with the conduit 18 and a flange 30 for connection with the tank around the periphery of the outlet opening therein.

The body 26 at the tank end of the passage therethrough is threaded as at 32 and screwthreadedly receives a cage structure 34 which has circumferentially spaced openings 36 therein.

Around the bottom part of the cage 34 there is formed a valve seat 37 and against this seat there seats a valve member 38 which includes a stem part 40 extending both ways from the valve member, an upper disc part 42 integral with the said stem and a lower disc nut 44 threaded on to the stem.

Between the disc and the nut there is placed a resilient valve disc 46 which directly engages the seat in fluid tight relation.

The lower end of the stem 40 is guided by a guide sleeve 48 supported on the spider legs 50 integral with and extending inwardly from the lower part of the cage 34.

The upper part of the stem 40 extends through a cap 52 which is machined so as to telescopically fit inside the upper part of the cage 34.

The cap 52 is adapted for being retained in position on the cage 34 by the projections 54 extending outwardly from the cap and which engage the slotted boxes 56 upstanding from the upper edge of the cage. The configuration of these boxes and the slots 58 therein which receive the projections 54 of the cap will be seen most clearly in Figures 2 and 3.

Surrounding the stem 40 and bearing between the valve member and the inside of the cap is a compression spring 60 which serves the dual function of urging the valve member toward its seat and also urges the cap upwardly in order to cause the projections 54 to rest in the recess parts 62 of the slots 58.

It will be apparent at this point that the telescopic engagement of the cap 52 with the upper part of the cage accurately locates and aligns the cap so that it accurately guides the upper end of the stem 40 of the valve member.

At the upper end of the valve member stem there is provided a lifting lug 64 which can be engaged by a hook from the manhole or filler opening of the compartment and lifts the valve member off its seat.

The upper surface of the cap is provided with a pair of spaced lugs 66 and which can be engaged by a tool, also introduced into the compartment through the filler opening therefor, for releasing the projections 54 from their engagement with the boxes 56. It will be apparent that disengagement of the cap 52 from the cage will permit the said cap and the valve member to be withdrawn from the valve as a unit.

Figures 2, 3, 8:
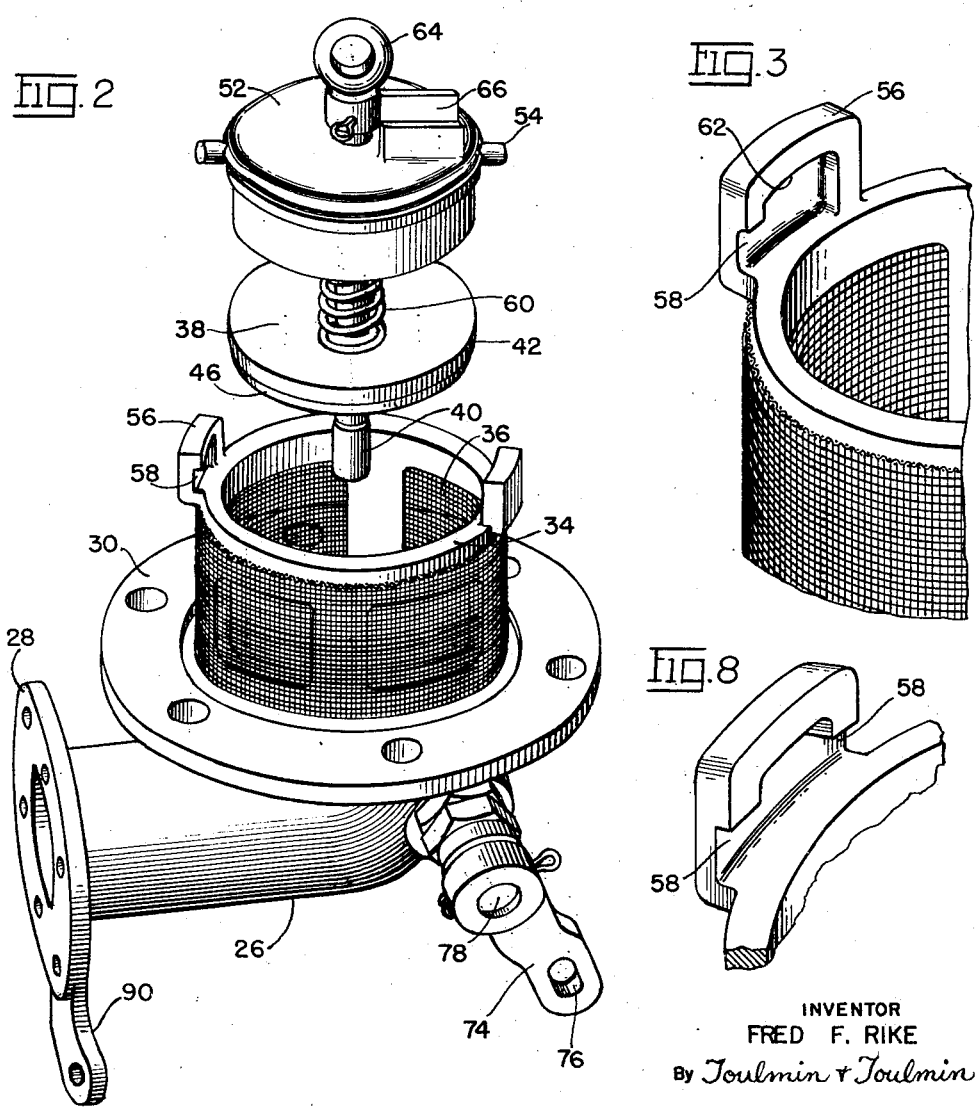
Figure 2 is a perspective view of the valve of this invention partially disassembled in order to show some of the constructional features thereof.
Figure 3 is a fragmentary perspective view showing one of the details of construction.
Figure 8 is a perspective view similar to Figure 3 but showing a modified form of construction.

It will also be observed, especially in Figure 2, that the boxes 56 on the cage are so shaped and positioned that a simple tool can be utilized for unscrewing the cage from its engagement with the valve body. All of this can be accomplished from outside the tank, so that the operative parts of the valve can be entirely removed therefrom without getting into the compartment in which the valve is mounted.

As mentioned before, it is often desired to screen the fluid which leaves the compartment. This can be accomplished with the valve of this invention by utilizing the screen cylinder 68 which is slipped over the cage before it is threaded into the valve body. This screen cylinder is retained in position by the boxes 56 which extend outwardy over the upper edges.

The mechanism 24 for opening the emergency valves from the dispensing station is connected with the said valves by means of pull rods 70, which have their ends adjacent the valves connected by the clevises 72 with the levers 74.

The connection of the clevises 72 with the levers 74 is by means of a slot 76. The end of the lever 74 opposite its connection with the clevis 72 is secured to the shaft or stem 78 which extends into the valve body, as best seen in Figures 4 and 7. This stem carries on its inner end a lifter 80, the inner end of which as at 82 lies directly under the lower end of the stem 40 of the valve member in the cage 34.

It will be seen that pulling on the bar 70 will cause the lever 74 to turn the stem 78 and to actuate the lifter 80 to raise the valve member 38 from its seat 37.

In order to prevent leakage from around the stem 78 there is the packing means 84, including the gland member 86 and spring 88, which presses the gland member against the packing.

Due to the fact that the cap 52 is guided by its telescopic engagement with the upper end of the cage 34, the inter-fitting parts of the cap and cage, namely, the slotted boxes 56 of the cage and the projections 54 of the cap, may be made to fit together relatively loosely. The act of inserting and removing the cap from engagement with the cage is therefore effective to maintain this connection clean and operative at all times.

As a modified arrangement, the boxes 56 may have the slots 58 therein extending out both sides so that the cap can be inserted and removed by turning it in either direction. This construction is illustrated in Figure 8.

Due to the length of the pull rod 70, this is preferably supplied with an auxiliary support in the form of the ear 90 extending outwardly from the flange 28 of the valve and having a bore therein through which the rod 70 passes.

As an additional safety feature for enabling the valve fully to carry out its function as an emergency unit, the body has an annular groove 92 therearound, as best seen in Figures 4 and 5, and the purpose of which is to permit the lower part of the valve body to break off from the upper part in the event of an accident; thus, leaving the cage and the upper flange 30 of the valve connected with the lower wall of the tank which the valve controls.

It will be understood that this invention is susceptible to modification in order to adopt it to different usages and conditions and, accordingly, it is desired to comprehend such modifications within this invention as may fall within the scope of the appended claims.

I claim:

1. In an emergency valve; an L-shaped body part having a flow passage; a cage screw threaded in one end of the passage and extending outwardly from the valve body; a seat in the end of the cage adjacent its connection with the valve body; a valve member in the cage for engagement with the seat therein to close the passage and having a stem extending both ways therefrom; a top cap telescopically fitting inside the outer end of the cage and surrounding the stem of the valve member; a spring bearing between the top cap of the valve member; and releasable inter-fitting parts in the top cap and cage for releasably retaining said cap and cage assembled, said spring at one time retaining said interfitting parts together and urging the valve member toward its seat, and a screen surrounding said cage and retained in position thereon by the interfitting portion of said cage.

2. In an emergency valve; an L-shaped body having a flow passage therethrough; a cage screw threadedly connected with the valve body at one end of the passage and extending outwardly from the valve body; a valve seat in the cage adjacent its connection with the valve body; a valve member in the cage for seating against the said seat and having a valve stem extending both ways therefrom; spaced guides carried by said cage for engaging and slidably guiding said stem and including a spider supported guide at the passage end of said cage and a removable top cap at the other end of said cage; a bayonet lock retaining said top cap in position on said cage; and a compression spring bearing between said top cap and said valve member and urging the bayonet lock into engagement and said valve member toward its seat, and a screen surrounding said cage and retained thereon by the bayonet lock member on said cage.

3. In an emergency valve; a body having a flow passage; a cage having one end threaded into one end of the passage; a valve member in the cage; a cap telescopically fitting inside the outer end of said cage; boxes extending outwardly and upwardly from said outer end of said cage and having inwardly opening slots therein; projections on the cap extending into said slots to retain said cap in position; a spring in said cage between said valve member and cap; and a screen surrounding said cage and retained in position thereon by said boxes.

4. In combination with a truck tank having a filling opening in the top and an outlet in the bottom; an emergency valve having an L-shaped body secured to said outlet beneath the tank; a screen cage threaded in the tank end of said passage extending into the tank; a seat in the lower end of the cage; a valve member in the cage to engage the seat and having a stem extending vertically therefrom; spaced guides for said stem in said cage including a spider support guide beneath the valve member and a cap detachably mounted on the top of said cage, said cap and cage being in telescopic engagement; circumferentially spaced upstanding ears on the top of said cage and inwardly opening peripheral slots therein having recesses in their upper walls; outwardly projecting fingers on the periphery of said cap for entering said slots to engage the recesses therein; and a spring around said stem between the cap and valve member to urge said valve member toward said seat and said fingers into said recesses, and a screen surrounding said cage and retained in position thereon by said ears.

5. In combination with a truck tank having a filling opening in the top and an outlet in the bottom; an emergency valve having an L-shaped body secured to said outlet beneath the tank; a screen cage threaded in the tank end of said passage extending into the tank; a seat in the lower end of the cage; a valve member in the cage to engage the seat and having a stem extending vertically therefrom; spaced guides for said stem in said cage including a spider support guide beneath the valve member and a cap detachably mounted on the top of said cage, said cap and cage being in telescopic engagement; circumferentially spaced upstanding ears on the top of said cage and inwardly opening peripheral slots therein having recesses in their upper walls; outwardly projecting fingers on the periphery of said cap for entering said slots to engage the recesses therein; a spring around said stem between the cap and valve member to urge said valve member toward said seat and said fingers into said recesses; a screen surrounding said cage and retained in position thereon by said ears; and means above said cap to engage and lift the stem to open the valve and to engage and turn the cap to release said fingers from engagement with said recesses.

6. In combination with a truck tank having a filling opening in the top and an outlet in the bottom; an emergency valve having an L-shaped body secured to said outlet beneath the tank; a screen cage threaded in the tank end of said passage extending into the tank; a seat in the lower end of the cage; a valve member in the cage to engage the seat and having a stem extending vertically therefrom; spaced guides for said stem in said cage including a spider support guide beneath the valve member and a cap detachably mounted on the top of said cage, said cap and cage being in telescopic engagement; circumferentially spaced upstanding ears on the top of said cage and inwardly opening peripheral slots therein having recesses in their upper walls; outwardly projecting fingers on the periphery of said cap for entering said slots to engage the recesses therein; a spring around said stem between the cap and valve member to urge said valve member toward said seat and said fingers into said recesses; a screen surrounding said cage and retained in position thereon by said ears; and means operable from beneath said tank or through said filling opening for lifting said valve member from its seat.

FRED F. RIKE.

REFERENCES CITED

The following references are of record in the file of this patent:

UNITED STATES PATENTS

| Number | Name | Date |
| --- | --- | --- |
| 1,534,139 | Ostrander | Apr. 21, 1925 |
| 1,890,247 | Dieterich | Dec. 6, 1932 |
| 2,109,870 | Thwaits | Mar. 1, 1938 |
| 2,190,723 | McBride | Feb. 20, 1940 |
| 2,237,377 | Thwaits | Apr. 8, 1941 |